(12) United States Patent
Godfrey et al.

(10) Patent No.: US 11,708,897 B2
(45) Date of Patent: Jul. 25, 2023

(54) SHIFT LOCK PROTECTION

(71) Applicant: Nissan North America, Inc., Franklin, TN (US)

(72) Inventors: Kristin Godfrey, Farmington Hills, MI (US); Carrie Dubay, Troy, MI (US)

(73) Assignee: Nissan North America, Inc., Franklin, TN (US)

( * ) Notice: Subject to any disclaimer, the term of this patent is extended or adjusted under 35 U.S.C. 154(b) by 34 days.

(21) Appl. No.: 17/602,380

(22) PCT Filed: Apr. 10, 2019

(86) PCT No.: PCT/US2019/026772
§ 371 (c)(1),
(2) Date: Oct. 8, 2021

(87) PCT Pub. No.: WO2020/209852
PCT Pub. Date: Oct. 15, 2020

(65) Prior Publication Data
US 2022/0090675 A1   Mar. 24, 2022

(51) Int. Cl.
*F16H 61/22* (2006.01)
*F16H 59/02* (2006.01)
*F16H 61/18* (2006.01)

(52) U.S. Cl.
CPC .............. *F16H 61/18* (2013.01); *F16H 61/22* (2013.01); *F16H 2059/0282* (2013.01)

(58) Field of Classification Search
CPC .......... F16H 61/18; F16H 61/22; F16H 61/16; F16H 2059/0282; F16H 2059/048;
(Continued)

(56) References Cited

U.S. PATENT DOCUMENTS

| | | | | |
|---|---|---|---|---|
| 5,419,596 A | * | 5/1995 | Okada ..................... | E05B 81/25 |
| | | | | 292/201 |
| 5,588,330 A | * | 12/1996 | Kataumi .................. | F16H 61/22 |
| | | | | 74/473.23 |

(Continued)

FOREIGN PATENT DOCUMENTS

| DE | 10128572 A1 | 1/2002 |
|---|---|---|
| DE | 102007058823 A1 | 6/2009 |

(Continued)

*Primary Examiner* — T. Scott Fix
(74) *Attorney, Agent, or Firm* — Young Basile Hanlon & MacFarlane, P.C.

(57) ABSTRACT

A shifter assembly for a vehicle includes: a body; a shift lock; and a shift lock lever that is supported by the body such that the shift lock lever is movable between a first position and a second position to cause corresponding movement of the shift lock between a locked position, in which the vehicle is immovable, and an unlocked position, in which the vehicle is movable. The shift lock lever includes a first end portion, and an opposite second end portion that is configured for contact with the shift lock. The second end portion is generally L-shaped in configuration, and defines an interior region that is configured to receive the shift lock to inhibit (if not entirely prevent) contact between the shift lock and other components of the vehicle to reduce any likelihood of inadvertent disengagement of the shift lock and unintended movement of the vehicle.

20 Claims, 3 Drawing Sheets

(58) Field of Classification Search
CPC ......... F16H 2061/226; F16H 2061/168; F16H 2061/185; F16H 63/3491; F16H 63/36
USPC ............... 74/473.21, 473.23, 473.24, 483 R, 74/483 PB, 527, 529, 473.4, 473.25
See application file for complete search history.

(56) References Cited

U.S. PATENT DOCUMENTS

| | | | |
|---|---|---|---|
| 5,593,011 A | | 1/1997 | Harada |
| 5,980,423 A | | 11/1999 | Suzuki et al. |
| 8,978,504 B2 | * | 3/2015 | Morimura ............... F16H 61/22 74/473.23 |
| 2005/0092120 A1 | | 5/2005 | Sakon et al. |
| 2008/0022805 A1 | * | 1/2008 | Howe ..................... F16H 61/22 74/527 |
| 2016/0061316 A1 | * | 3/2016 | Rice ........................ F16D 11/10 74/491 |
| 2018/0245683 A1 | * | 8/2018 | Kim .................... F16H 59/0278 |

FOREIGN PATENT DOCUMENTS

| | | | | |
|---|---|---|---|---|
| DE | 102017222053 A1 | * | 8/2018 | ......... F16H 59/0278 |
| EP | 2284421 A2 | | 2/2011 | |
| JP | H02-011423 A | | 1/1990 | |
| JP | H8-326880 A | | 12/1996 | |
| JP | H10-217793 A | | 8/1998 | |
| JP | 2897935 B2 | * | 5/1999 | |
| JP | 11190419 A | * | 7/1999 | |
| JP | H11321367 A | * | 11/1999 | |
| JP | 2007283819 A | * | 11/2007 | |

* cited by examiner

SHIFT LOCK PROTECTION

CROSS-REFERENCE TO RELATED APPLICATION(S)

This application is a national stage 371 application of PCT/US2019/026772, filed on Apr. 10, 2019, the entire disclosure of which is hereby incorporated by reference.

TECHNICAL FIELD

The present disclosure generally relates to the protection of a shift lock in a vehicle to inhibit (if not entirely prevent) unintended contact between the shift lock and other components in the vehicle.

BACKGROUND

Vehicles generally include a shift lock that prevents unintentional movement of the vehicle's shifter from the parked position. During normal operation, upon depression of the brake, the shift lock is disengaged and the shifter can be moved as desired. However, when the vehicle is inoperable (e.g., when the vehicle's battery has died), in order to allow the vehicle to be shifted from park, to permit towing, for example, the shift lock has to be manually disengaged. In such circumstances, the shift lock lever is usually repositioned manually (e.g., the shift lock is depressed), which causes the shift lock lever to act upon the shift lock to move the shift lock from a locked position, in which movement of the shifter is prevented, into an unlocked position, in which movement of the shifter is allowed.

Conventionally, the location of the shift lock lends itself to potential contact with other components in the vehicle, such as wiring harnesses, trim pieces, etc., creating the possibility of unintended movement of the shift lock and, thus, unintended movement of the shifter. The present disclosure addresses this potentiality by providing a shift lock lever that offers greater protection of the shift lock.

SUMMARY

In one aspect of the present disclosure, a shifter assembly for a vehicle is disclosed. The shifter assembly includes: a body; a shift lock that extends laterally outward from the body; and a shift lock lever that is supported by the body such that the shift lock lever is movable between a first position and a second position. The shift lock is movable between a locked position, in which the vehicle is immovable, and an unlocked position, in which the vehicle is movable. The shift lock lever includes a first end portion, and an opposite second end portion that is configured for contact with the shift lock such that movement of the shift lock lever between the first position and the second position results in corresponding movement of the shift lock between the locked position and the unlocked position. The second end portion of the shift lock lever defines an interior region that is configured to receive the shift lock.

In certain embodiments, the second end portion of the shift lock lever may include a first segment, and a second segment that extends from the first segment such that the second end portion of the shift lock lever is generally L-shaped in configuration.

In certain embodiments, the first segment may include a height that is substantially within the range of approximately 10 mm to approximately 15 mm, a width that is substantially within the range of approximately 6 mm to approximately 10 mm, and a thickness that is substantially within the range of approximately 1 mm to approximately 3 mm.

In certain embodiments, the first segment and the second segment may subtend an angle therebetween that is substantially within the range of approximately 60° to approximately 120°.

In certain embodiments, the first segment may define a terminal end that is positioned vertically below the shift lock.

In certain embodiments, the shift lock lever may include a first lateral end defining a vertical flange that is configured for contact with the body of the shifter assembly, and an opposite second lateral end. In such embodiments, the shift lock lever may be configured such that the second lateral end is spaced laterally outward of the shift lock (i.e., farther from the body of the shifter assembly).

In certain embodiments, the second end portion of the shift lock lever may further include a third segment that extends between the first and second segments such that the third segment extends in generally parallel relation to the vertical flange.

In certain embodiments, the shift lock lever may further include at least one rib that extends between the first lateral end and the second lateral end. In such embodiments, the at least one rib may include a tapered configuration such that the at least one rib defines a variable vertical height that decreases from the first lateral end towards the second lateral end.

In certain embodiments, the shift lock lever may include a body portion defining an upper surface, and the at least one rib may extend vertically from the upper surface. In such embodiments, the at least one rib may define an outer contact surface that subtends an acute angle with the upper surface of the body portion to inhibit objects from contacting the shift lock and/or resting upon the shift lock lever.

In certain embodiments, the acute angle may lie substantially within the range of approximately 30° to approximately 60°.

In another aspect of the present disclosure, a method of restricting unintended movement of a shift lock in a vehicle between locked and unlocked positions is disclosed. The method includes connecting a shift lock lever to a body of a shifter assembly in the vehicle such that the shift lock is concealed within an interior region defined at an end of the shift lock lever.

In certain embodiments, connecting the shift lock lever to the body of the shifter assembly may include orienting the shift lock lever such that a terminal end of the shift lock lever is positioned vertically below the shift lock.

In certain embodiments, connecting the shift lock lever to the body of the shifter assembly may include orienting the shift lock lever such that a lateral end of the shift lock lever is spaced laterally outward of the shift lock (i.e., farther from the body of the shifter assembly).

In another aspect of the present disclosure, a shift lock lever is disclosed that is configured for use with a shifter assembly in a vehicle such that movement of the shift lock lever results in corresponding movement of a shift lock between locked and unlocked positions to allow for movement of the vehicle. The shift lock lever includes a body portion having a first end portion, and an opposite second end portion defining a partially enclosed interior region that is configured to receive the shift lock. The second end portion is configured for contact with the shift lock such that movement of the shift lock lever between first and second positions results in corresponding movement of the shift lock between the locked and unlocked positions.

In certain embodiments, the second end portion of the shift lock lever may be generally L-shaped in configuration.

In certain embodiments, the second end portion of the shift lock lever may include a first segment, and a second segment that extends from the first segment so as to subtend an angle therebetween that is substantially within the range of approximately 60° to approximately 120°.

In certain embodiments, the first segment may include a height that is substantially within the range of approximately 10 mm to approximately 15 mm, a width that is substantially within the range of approximately 6 mm to approximately 10 mm, and a thickness that is substantially within the range of approximately 1 mm to approximately 3 mm. For example, in one particular embodiment, the height of the first segment may be approximately 12 mm, the width of the first segment may be approximately 8 mm, and the thickness of the first segment may be approximately 1.7 mm.

In certain embodiments, the shift lock lever may further include at least one rib that extends vertically upward from an outer surface of the second segment. In such embodiments, the at least one rib may include a tapered configuration to inhibit objects from contacting the shift lock and/or resting upon the shift lock lever.

In certain embodiments, the shift lock lever may further include a first lateral end defining a vertical flange, and an opposite second lateral end. In such embodiments, the at least one rib may extend between the first and second lateral ends, and may define a height that decreases from the first lateral end towards the second lateral end.

BRIEF DESCRIPTION OF THE DRAWINGS

According to common practice, the various features of the drawings may not be to scale, and may be arbitrarily expanded or reduced for clarity.

DETAILED DESCRIPTION

The present disclosure describes a shift lock lever for a vehicle that is movable from a first (initial) position to a second (subsequent) position (e.g., via manual depression) to cause corresponding movement of a vehicle's shift lock from a locked position, in which the vehicle's shifter is locked in the parked position and the vehicle is immovable, to an unlocked position, in which the vehicle's shifter is movable from the parked position (into neutral, drive, etc.) to allow for movement (e.g., towing) of the vehicle. The shift lock lever includes a generally L-shaped end portion that is configured to not only contact the shift lock to allow for movement in the manner described, but to receive (or otherwise conceal) the shift lock. Through such concealment, the shift lock can be protected from contact with other components in the vehicle, such as wiring harnesses, trim pieces, etc., to inhibit (if not entirely prevent) the likelihood of inadvertent disengagement of the shift lock and, thus, inadvertent movement of the vehicle.

Figure 1:
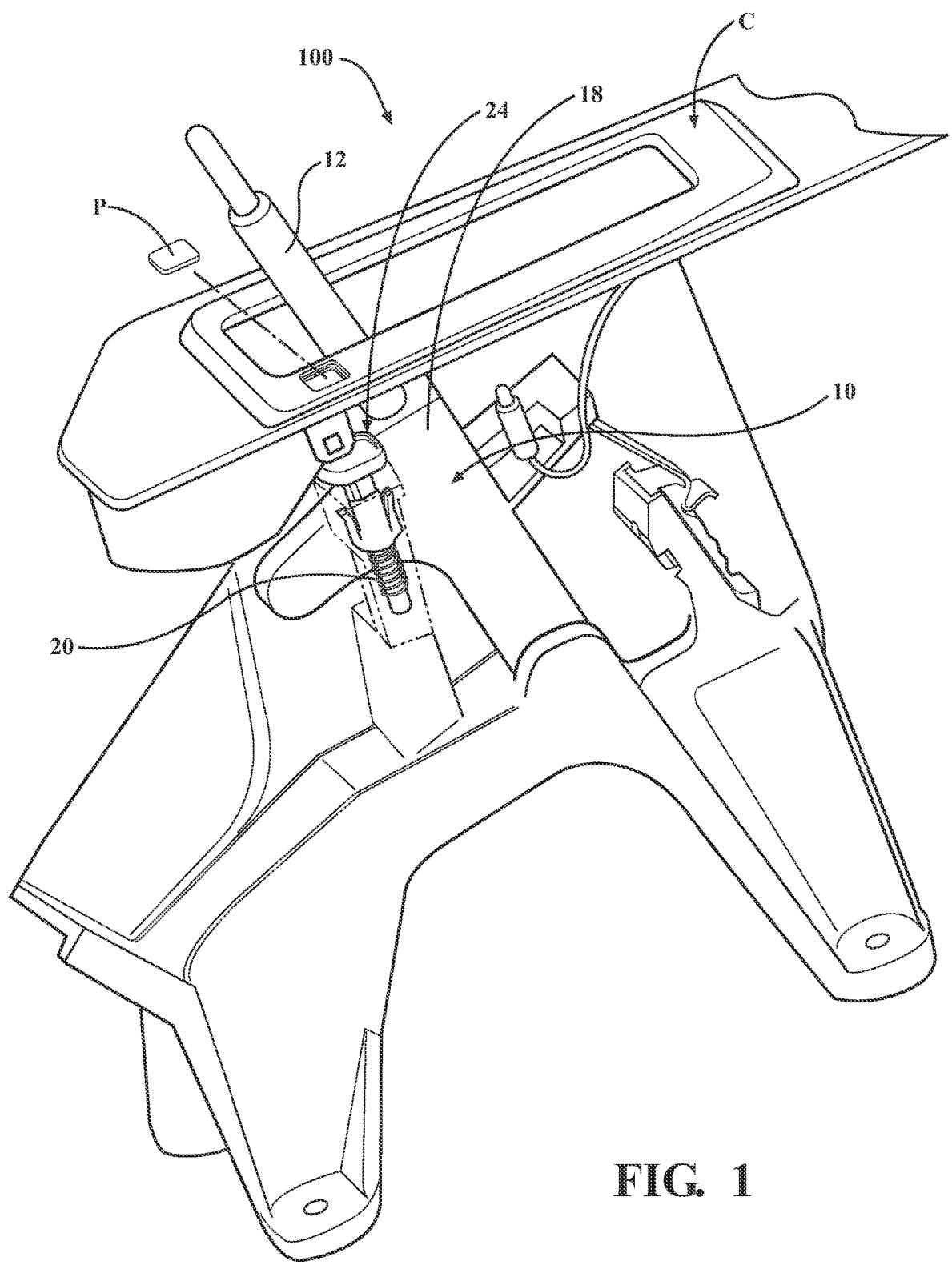
FIG. 1 is a top, perspective view of a shifter assembly in a vehicle shown with one embodiment of a shift lock lever according to the principles of the present disclosure.
Figure 2:
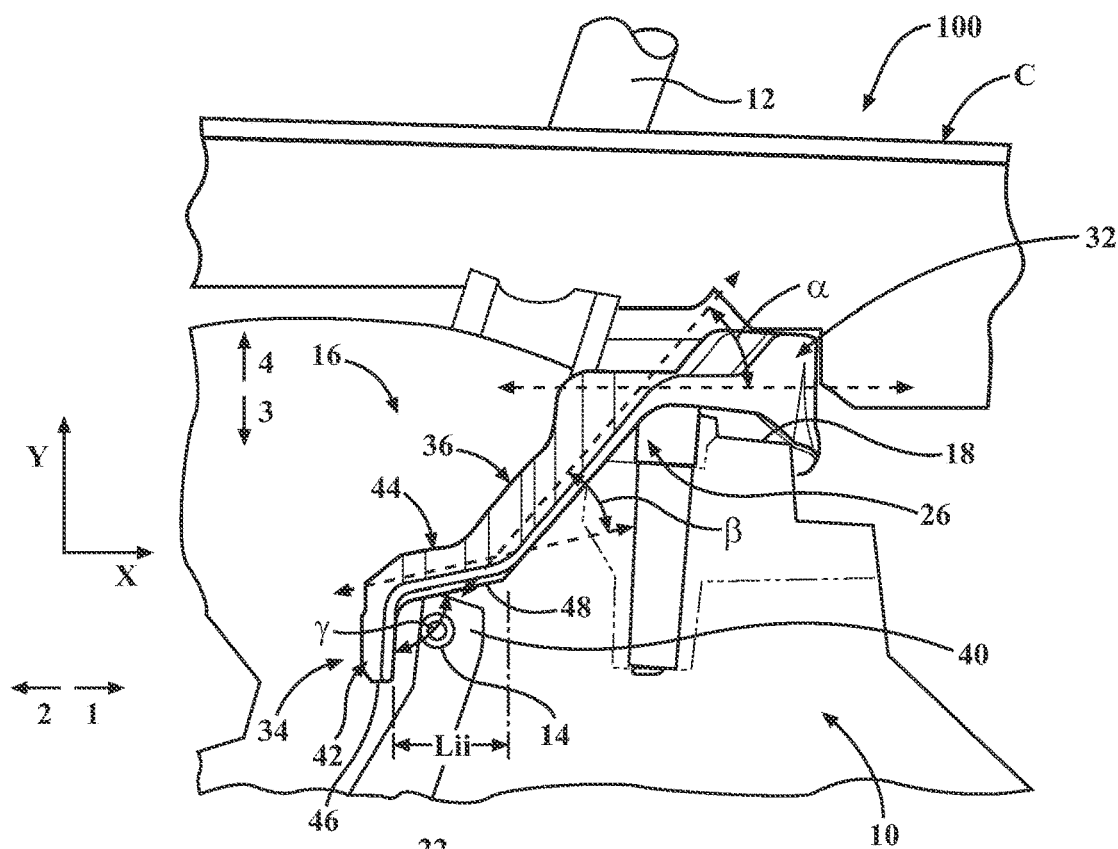
FIG. 2 is a partial, side view of the shifter assembly and the shift lock lever seen in FIG. 1.
Figure 3:
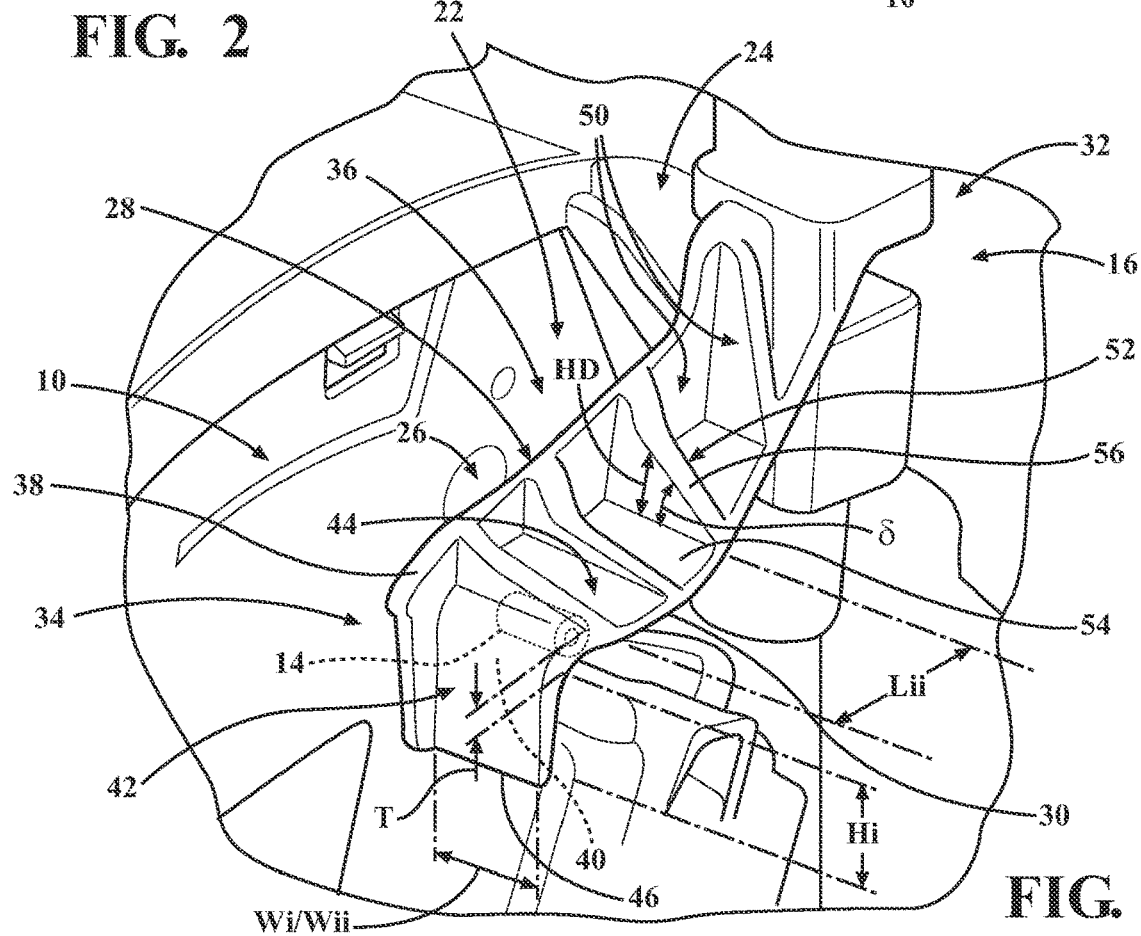
FIG. 3 is a partial, top, perspective view of the shifter assembly and the shift lock lever seen in FIG. 1.

With reference now to FIGS. 1-3, one embodiment of a shifter assembly is illustrated, which is identified by the reference character 100. The shifter assembly 100 includes: a body 10; a shifter 12; a shift lock 14 that extends laterally outward from the body 10 (e.g., by approximately 4 mm to approximately 6 mm); and a shift lock lever 16. As is conventional, the shifter 12 extends from the body 10 of the shifter assembly 100, and is movable between a series of positions (e.g., park, reverse, neutral, drive, etc.) during operation of the vehicle. Although shown as extending through the vehicle's center console C (FIGS. 1, 2) in the illustrated embodiment, alternate locations for the shifter 12 would not be beyond the scope of the present disclosure.

The shift lock 14 is movable (e.g., in relation to the body 10 of the shifter assembly 100) in the directions indicated by arrows 1, 2 (along a first axis X) (FIG. 2) to allow for engagement and disengagement of the shift lock 14. More specifically, movement in the direction indicated by arrow 1 repositions the shift lock 14 from a first (locked) position, in which the shift lock 14 is engaged to prevent movement of the shifter 12 from the parked position and, thus, movement of the vehicle, to a second (unlocked) position, in which the shift lock 14 is disengaged to allow for movement of the shifter 12 from the parked position (e.g., into reverse, neutral, drive, etc.) and, thus, movement of the vehicle. Upon movement of the shift lock 14 in the opposite direction indicated by arrow 2, the shift lock 14 is returned to the first (locked) position from the second (unlocked) position to reengage the shift lock 14.

The shift lock lever 16 is configured for engagement (or other such contact) with the shift lock 14 to cause movement of the shift lock 14 between the first (locked) and second (unlocked) positions via movement of the shift lock lever 16 (along a second axis Y) (FIG. 2) in the directions indicated by arrows 3, 4 (e.g., in relation to the body 10 of the shifter assembly 100). More specifically, upon depression of the shift lock lever 16, the shift lock lever 16 is moved in the direction indicated by arrow 3 from a first (initial) position to a second (subsequent) position to cause movement of the shift lock 14 in the direction indicated by arrow 1. Upon movement of the shift lock lever 16 in the opposite direction indicated by arrow 4, the shift lock lever 16 is returned to the first (initial) position, which allows the shift lock 14 to be returned to the first (locked) position. Although shown as being supported by (or otherwise connected to) an upper end 18 of the body 10 of the shifter assembly 100, the specific location and/or manner of connection between the shift lock lever 16 and the body 10 of the shifter assembly 100 may be varied in alternate embodiments without departing from the scope of the present disclosure.

In certain embodiments, it is envisioned that the shifter assembly 100 may include a biasing member 20 (e.g., a spring, coil, etc.) (FIG. 1) to bias the shift lock lever 16 towards the first (initial) position.

The shift lock lever 16 may include (e.g., may be formed from) any suitable material including, for example, plastics, polymers, etc., and may define any suitable thickness T (FIG. 3). For example, it is envisioned that the thickness T may lie substantially within the range of approximately 1 mm to approximately 3 mm (e.g., approximately 1.5 mm to approximately 1.7 mm). The shift lock lever 16 includes a body portion 22 with a first leg 24 (FIGS. 1, 3) that supports connection of the shift lock lever 16 to the body 10 of the shifter assembly 100, and a second leg 26 that extends transversely from the first leg 24. Although shown as being generally orthogonal in relation to one another, it should be appreciated that the particular configuration and/or orientation of the legs 24, 26 may be altered in various embodiments of the disclosure (e.g., depending upon spatial allowances, the configuration of the body 10 of the shifter assembly 100, the location of the shift lock 14, etc.).

The second leg 26 of the shift lock lever 16 includes a first (inner) lateral end 28, an opposite second (outer) lateral end 30, a first (front) end portion 32 that is positioned adjacent to (e.g., connected to) the first leg 24, an opposite second (rear) end portion 34, and a trunk (body portion) 36 that extends between the end portions 32, 34. In the illustrated embodiment, the lateral end 28 defines a vertical flange 38 (FIG. 3) that is configured for contact (or other such engagement) with the body 10 of the shifter assembly 100 (e.g., to stabilize the shift lock lever 16). In various embodiments of the disclosure, it is envisioned that the second (outer) lateral end 30 may also include a flange 38, or that the flange(s) 38 may be eliminated altogether.

The trunk 36 extends between the end portions 32, 34 such that the end portion 34 is positioned vertically below the end portion 32 to facilitate contact with the shift lock 14, as described in further detail below. In the particular embodiment of the disclosure shown throughout the figures, the trunk 36 subtends angles α, β with the end portions 32, 34, respectively, that each lie substantially within the range of approximately 35° to approximately 55° (e.g., approximately 45°). It should be appreciated, however, that the configuration of the shift lock lever 16 may be altered in various embodiments of the disclosure to achieve any suitable or desirable values for the angles α, β (e.g., depending upon the particular configuration of the shifter assembly 100, the location of the shift lock 14, etc.).

The second end portion 34 defines a (partially enclosed) interior region 40 (e.g., a cavity, chamber, recess, etc.) (FIGS. 2, 3) that accommodates (or otherwise receives) the shift lock 14. Concealing the shift lock 14 within the interior region 40 protects the shift lock 14 and reduces the likelihood of contact between the shift lock 14 and other components of the vehicle, such as wiring harnesses, trim pieces, etc., to inhibit (if not entirely prevent) inadvertent disengagement of the shift lock 14 (i.e., movement from the shift lock 14 in the direction indicated by arrow 1 (FIG. 2)). In the particular embodiment shown throughout the figures, the second end portion 34 defines a generally L-shaped cross-sectional configuration, and includes respective first and second segments 42, 44 that collectively define the interior region 40. Although shown as being arranged in generally orthogonal relation (i.e., such that the segments 42, 44 subtend an angle γ of approximately 90°), it should be appreciated that the configuration and/or relative positioning of the segments 42, 44 may be varied in alternate embodiments of the disclosure. For example, it is envisioned that the segments 42, 44 may be arranged such that the angle γ lies substantially within the range of approximately 60° to approximately 120°.

The segments 42, 44 of the second end portion 34 are dimensioned to create vertical and lateral clearance between the shift lock 14 and the surrounding components of the vehicle (e.g., the aforementioned wiring harness(es), trim pieces, etc.) to inhibit (or entirely prevent) contact between the shift lock 14 and the surrounding components. The first segment 42 defines a height Hi (FIG. 3) and a width Wi, and the second segment 44 defines a width Wii and a length Lii (FIGS. 2, 3). The height Hi of the first segment 42 is such that a terminal end 46 of the first segment 42 is positioned vertically below the shift lock 14, and the respective widths Wi, Wii of the segments 42, 44 are such that the (second) lateral end 30 of the shift lock lever 16 is spaced laterally outward of the shift lock 14 (i.e., farther from the body 10 of the shifter assembly 100), whereby the second end portion 34 of the shift lock lever 16 extends vertically below, and laterally outward of, the shift lock 14. For example, in certain embodiments, it is envisioned that the height Hi of the first segment 42 may lie substantially within the range of approximately 10 mm to approximately 15 mm (e.g., 12 mm), and that the respective widths Wi, Wii of the segments 42, 44 may lie substantially within the range of approximately 6 mm to approximately 10 mm (e.g., 8 mm). Although shown as being generally equivalent in the embodiment of the shift lock lever 16 illustrated throughout the figures, it should be appreciated that the respective widths Wi, Wii of the segments 42, 44 may be dissimilar in alternate embodiments of the disclosure. For example, it is envisioned that the width Wi of the first segment 42 may exceed the width Wii of the second segment 44, or that the width Wii of the second segment 44 may exceed the width Wi of the first segment 42.

The second segment 44 is configured for contact with the shift lock 14 such that the shift lock 14 is disengageable (i.e., movable into the second (unlocked) position) upon depression of the shift lock lever 16 (i.e., movement from the first (initial) position to the second (subsequent) position). More specifically, the second segment 44 defines a bearing surface 48 (FIG. 2) that is configured for contact with the shift lock 14 to displace the shift lock 14 in the direction indicated by arrow 1 upon movement of the shift lock lever 16 in the direction indicated by arrow 3. By adjusting the position of the second segment 44 relative to the trunk 36 (e.g., by varying one or more of the angles α, β (FIG. 2)), the amount of vertical movement of the shift lock lever 16 required to cause sufficient displacement of the shift lock 14 may be varied.

In certain embodiments, such as that shown throughout the figures, the shift lock lever 16 may include one or more deflectors 50 (e.g., ribs 52) (FIG. 3) that are configured to discourage items, such as surrounding components of the vehicle (e.g., the aforementioned wiring harness(es), trim pieces, etc.), debris, or the like from coming to rest on the shift lock lever 16 and/or from coming into contact with the shift lock 14 (e.g., under the influence of gravity). In the particular embodiment seen in FIG. 3, for example, the shift lock lever 16 includes four deflectors 50 that are spaced approximately equidistant from one another. It should be appreciated, however, that the number and/or the particular location of the deflectors 50 may be varied in alternate embodiments of the disclosure.

The deflectors 50 extend vertically upwardly from an upper surface 54 of the body portion 22 (e.g., from the trunk 36), and include generally tapered configurations. More specifically, in the illustrated embodiment, the deflectors 50 extend from the first (inner) lateral end 28 (e.g., from the flange 38) to the second (outer) lateral end 30, and each define a vertical height HD that decreases towards the second (outer) lateral end 30. The deflectors 50 each define an outer contact surface 56 that subtends an angle δ with the upper surface 54. In the particular embodiment seen in FIG. 3, for example, the deflectors 50 are configured such that the angle δ is acute, and lies substantially within the range of approximately 15° to approximately 75°. It should be appreciated, however, that the configuration of the deflectors 50 (e.g., the angle δ) may be varied in alternate embodiments of the disclosure.

With continued reference to FIGS. 1-3, a method of using (operating) the shift lock lever 16 will be discussed. The shift lock lever 16 provides a manual override that allows the shift lock 14 to be disengaged such that the shifter 12 can be moved from the parked position (e.g., into neutral) to allow the vehicle to be moved, for example, in the event that the vehicle must be towed. To disengage the shift lock 14, a force is (manually) applied to the shift lock lever 16 (e.g., through an access panel P (FIG. 1) in the console C). More specifically, the shift lock lever 16 is depressed (i.e., moved vertically downward in the direction indicated by arrow 3 (FIG. 2)), which causes the bearing surface 48 (FIG. 2) defined by the second segment 44 to apply a force to the shift lock 14 that causes forward displacement of the shift lock 14 (in the direction indicated by arrow 1). Movement of the shift lock lever 16 from the first (initial) position to the second (subsequent) position thus causes corresponding movement of the shift lock 14 from the first (locked) position to the second (unlocked) position to thereby disengage the shift lock 14 and allow for movement of the shifter 12 from the parked position.

Figure 4:
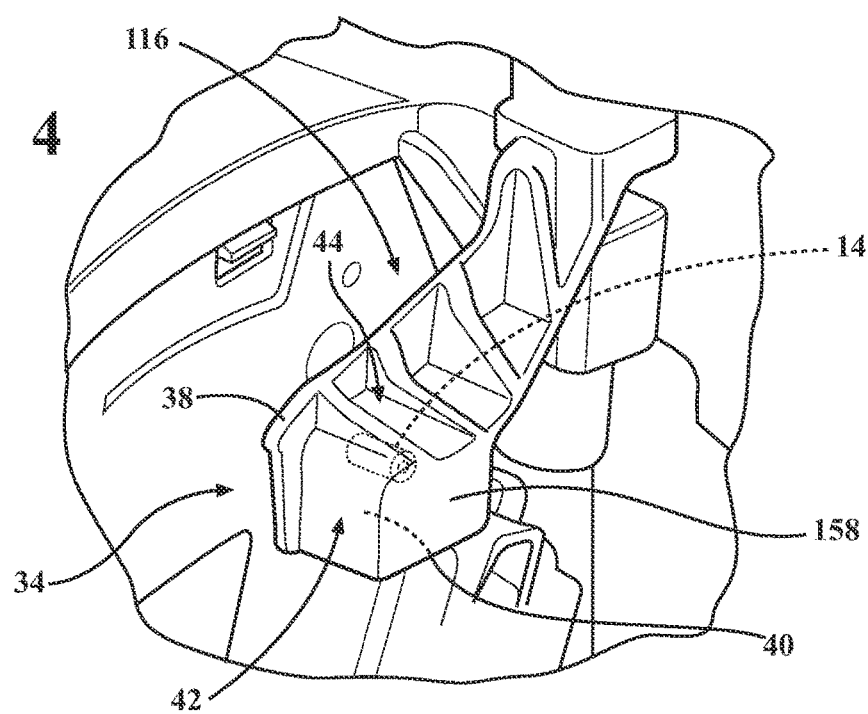
FIG. 4 is a partial, top, perspective view of the shifter assembly shown with an alternate embodiment of the shift lock lever.
Figure 5:
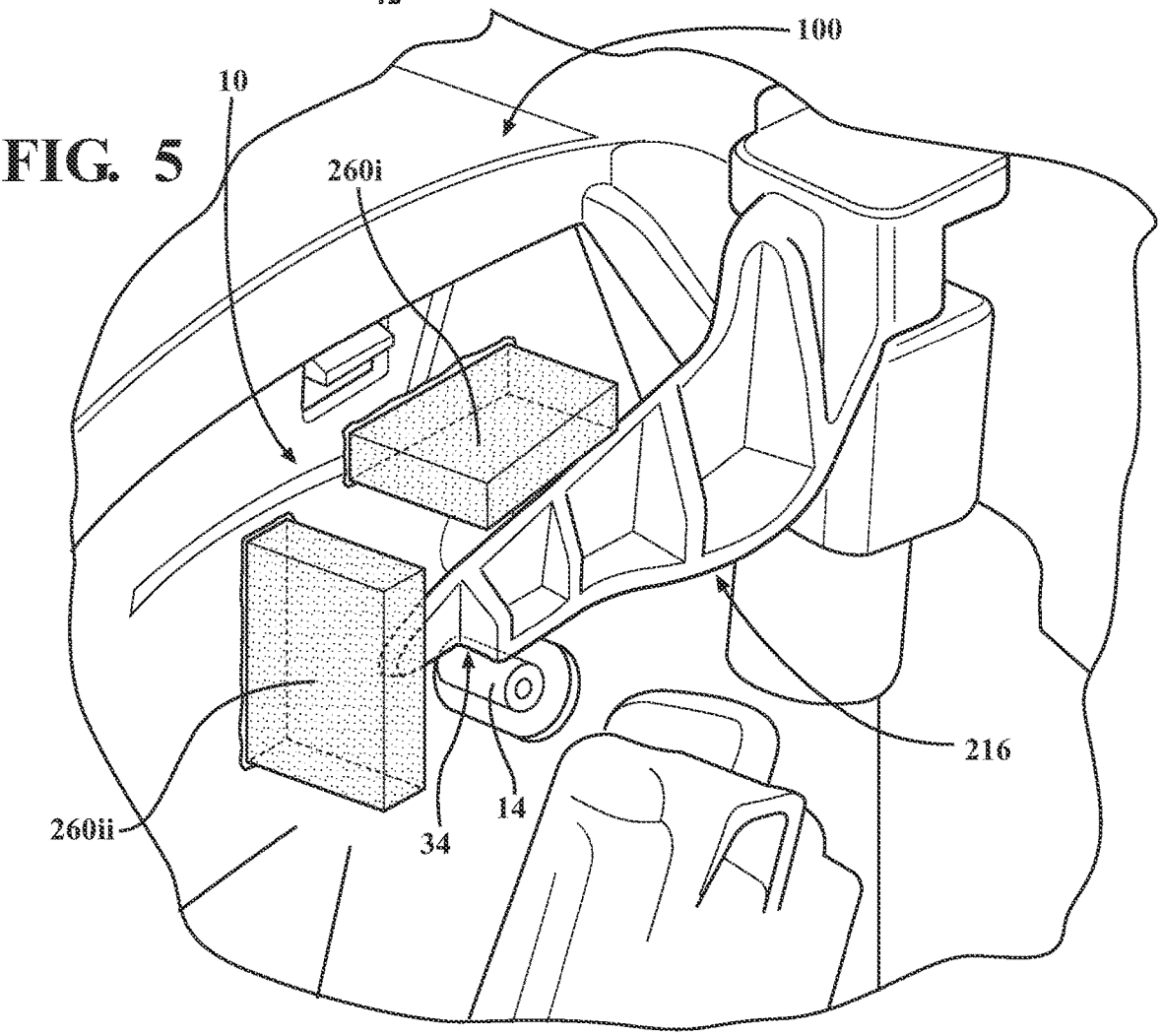
FIG. 5 is a partial, top, perspective view of the shifter assembly shown with an alternate embodiment of the shift lock lever, and a pair of guards that extend outwardly from a body of the shifter assembly.

With reference now to FIGS. 4 and 5, alternate embodiments of the shift lock lever 16 will be discussed. Each of the embodiments discussed hereinbelow is substantially similar in both structure and function to the shift lock lever 16, and, accordingly, in the interest of brevity, will be discussed only with respect to any differences therefrom.

FIG. 4 illustrates an embodiment of the shift lock lever that is identified by the reference character 116. In addition to the respective first and second segments 42, 44 discussed above, the second end portion 34 of the shift lock lever 116 further includes a third segment 158 that extends between the segments 42, 44 to further enclose the interior region 40 and, thus, further conceal the shift lock 14 to further inhibit contact between the shift lock 14 and the surrounding components in the vehicle. More specifically, in the illustrated embodiment, the third segment 158 extends in generally parallel relation to the flange 38. It should be appreciated, however, that alternate configurations and/or orientations for the third segment 158 would not be beyond the scope of the present disclosure. For example, it is envisioned that the third segment 158 may extend outwardly (at an angle to the flange 38).

FIG. 5 illustrates another embodiment of the shift lock lever identified by the reference character 216 that is generally narrower than the shift lock lever 16 seen in FIGS. 1-3, and devoid of the aforementioned L-shaped configuration at the second end portion 34. To inhibit contact between the shift lock 14 and other components of the vehicle and, thus, inadvertent disengagement of the shift lock 14, one or more guards 260 may be secured to (or may otherwise extend outwardly from) the body 10 of the shifter assembly 100, which may include (e.g., may be formed from) any suitable material, such as foam(s), polymeric materials, plastic materials, metallic materials, etc., either individually or in combination. For example, in the illustrated embodiment, a first guard 260i is positioned vertically above the shift lock lever 216, and a second guard 260ii is positioned rearwardly of the second end portion 34. Although shown as separate, discrete structures, in alternate embodiments of the disclosure, it is envisioned that the guards 260i, 260ii may be secured together (e.g., mechanically connected, integrally (monolithically) formed, etc.).

In certain embodiments, it is envisioned that the guard(s) 260 may be removably connected to the body 10 of the shifter assembly 100 (e.g., through the use of an adhesive, mechanical fasteners, etc.). Alternatively, it is envisioned that the guard(s) 260 may be fixedly secured to the body 10 of the shifter assembly 100 (e.g., via welding, or via integral (e.g., monolithic) formation with the body 10).

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure, and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above but is defined by the claims that follow and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. A shifter assembly for a vehicle, comprising:
   a body;
   a shifter extending from the body;

a shift lock extending laterally outward from the body, the shift lock being movable between a locked position, in which the vehicle is immovable, and an unlocked position, in which the vehicle is movable, the shifter and the shift lock being movable in corresponding directions; and a shift lock lever supported by the body such that the shift lock lever is linearly movable between a first position and a second position, the shift lock lever including a first end portion, and an opposite second end portion configured for contact with the shift lock such that movement of the shift lock lever between the first position and the second position results in corresponding movement of the shift lock and moves the shift lock between the locked position and the unlocked position, the shift lock and the shift lock lever being movable in non-corresponding directions, the second end portion of the shift lock lever defining an interior region configured to receive the shift lock.

2. The shifter assembly of claim 1, wherein the second end portion of the shift lock lever includes a first segment, and a second segment extending from the first segment such that the second end portion of the shift lock lever is generally L-shaped in configuration.

3. The shifter assembly of claim 2, wherein the first segment includes a height substantially within a range of approximately 10 mm to approximately 15 mm, a width substantially within a range of approximately 6 mm to approximately 10 mm, and a thickness substantially within a range of approximately 1 mm to approximately 3 mm.

4. The shifter assembly of claim 2, wherein the first segment and the second segment subtend an angle therebetween substantially within a range of approximately 60° to approximately 120°.

5. The shifter assembly of claim 2, wherein the first segment defines a terminal end positioned vertically below the shift lock.

6. The shifter assembly of claim 5, wherein the shift lock lever includes a first lateral end defining a vertical flange configured for contact with the body of the shifter assembly, and an opposite second lateral end, the shift lock lever being configured such that the second lateral end is spaced laterally outward of the shift lock.

7. The shifter assembly of claim 6, wherein the second end portion of the shift lock lever further includes a third segment extending between the first and second segments such that the third segment extends in generally parallel relation to the vertical flange.

8. The shifter assembly of claim 6, wherein the shift lock lever further includes at least one rib extending between the first lateral end and the second lateral end, the at least one rib including a tapered configuration such that the at least one rib defines a variable vertical height decreasing from the first lateral end towards the second lateral end.

9. The shifter assembly of claim 8, wherein the shift lock lever includes a body portion defining an upper surface, the at least one rib extending vertically from the upper surface and defining an outer contact surface, the outer contact surface subtending an acute angle with the upper surface of the body portion to inhibit objects from contacting the shift lock and/or resting upon the shift lock lever.

10. The shifter assembly of claim 9, wherein the acute angle lies substantially within a range of approximately 30° to approximately 60°.

11. A method of restricting unintended movement of a shift lock in a vehicle between locked and unlocked positions, the method comprising:

connecting a shift lock lever to a body of a shifter assembly in the vehicle such that the shift lock is concealed within a partially enclosed interior region defined at an end of the shift lock lever, the shift lock lever defining an angled bearing surface configured for contact with the shift lock such that linear movement of the shift lock lever displaces the shift lock in a direction of movement corresponding to that of a shifter in the vehicle, the shift lock and the shift lock lever being movable in non-corresponding directions.

12. The method of claim 11, wherein connecting the shift lock lever to the body of the shifter assembly includes orienting the shift lock lever such that a terminal end of the shift lock lever is positioned vertically below the shift lock.

13. The method of claim 12, wherein connecting the shift lock lever to the body of the shifter assembly includes orienting the shift lock lever such that a lateral end of the shift lock lever is spaced laterally outward of the shift lock.

14. A shift lock lever configured for use with a shifter assembly in a vehicle such that movement of the shift lock lever results in corresponding movement of a shift lock between locked and unlocked positions to allow for movement of a shifter of the shifter assembly and, thus, movement of the vehicle, the shift lock lever comprising:

a body portion having a first end portion, and an opposite second end portion configured for contact with the shift lock such that linear movement of the shift lock lever between first and second positions results in corresponding movement of the shift lock between the locked and unlocked positions, the shift lock lever being configured such that the shift lock lever and the shift lock are movable in non-corresponding directions, the second end portion defining a partially enclosed interior region configured to receive the shift lock and an angled bearing surface configured for contact with the shift lock to displace the shift lock in a direction of movement corresponding that of the shifter, wherein the shift lock lever is configured for contact by a user so as to provide an override allowing the shift lock to be moved into the unlocked position.

15. The shift lock lever of claim 14, wherein the second end portion is generally L-shaped in configuration.

16. The shift lock lever of claim 15, wherein the second end portion includes a first segment, and a second segment extending from the first segment so as to subtend an angle therebetween substantially within a range of approximately 60° to approximately 120°.

17. The shift lock lever of claim 16, wherein the first segment includes a height substantially within a range of approximately 10 mm to approximately 15 mm, a width substantially within a range of approximately 6 mm to approximately 10 mm, and a thickness substantially within a range of approximately 1 mm to approximately 3 mm.

18. The shift lock lever of claim 17, wherein the height of the first segment is approximately 12 mm, the width of the first segment is approximately 8 mm, and the thickness of the first segment is approximately 1.7 mm.

19. The shift lock lever of claim 16, further including at least one rib extending vertically upward from an outer surface of the second segment, the at least one rib including a tapered configuration to inhibit objects from contacting the shift lock and/or resting upon the shift lock lever.

20. The shift lock lever of claim 19, further including a first lateral end defining a vertical flange, and an opposite second lateral end, the at least one rib extending between the first and second lateral ends, and defining a height that decreases from the first lateral end towards the second lateral end.

* * * * *